(12) United States Patent
Gray et al.

(10) Patent No.: US 8,584,180 B2
(45) Date of Patent: *Nov. 12, 2013

(54) METHOD TO ENABLE COOPERATIVE PROCESSING AND RESOURCE SHARING BETWEEN SET-TOP BOXES, PERSONAL COMPUTERS, AND LOCAL DEVICES

(75) Inventors: James H. Gray, Atlanta, GA (US); Scott Russell Swix, Duluth, GA (US); P. Thomas Watson, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/597,319

(22) Filed: Aug. 29, 2012

(65) Prior Publication Data

US 2013/0160040 A1    Jun. 20, 2013

Related U.S. Application Data

(63) Continuation of application No. 12/241,918, filed on Sep. 30, 2008, now Pat. No. 8,276,179, and a continuation of application No. 10/107,566, filed on Mar. 27, 2002, now Pat. No. 7,430,753.

(51) Int. Cl.
*H04N 7/18* (2006.01)

(52) U.S. Cl.
USPC ............. 725/80; 725/131; 725/132; 725/139; 725/151

(58) Field of Classification Search
None
See application file for complete search history.

(56) References Cited

U.S. PATENT DOCUMENTS

| 4,930,158 | A | 5/1990 | Vogel |
| 4,930,160 | A | 5/1990 | Vogel |
| 5,168,372 | A | 12/1992 | Sweetser |
| 5,191,645 | A | 3/1993 | Carlucci et al. |
| 5,195,135 | A | 3/1993 | Palmer |
| 5,329,590 | A | 7/1994 | Pond |
| 5,398,070 | A | 3/1995 | Lee |

(Continued)

FOREIGN PATENT DOCUMENTS

| EP | 0508939 A2 | 10/1992 |
| EP | 0952734 A2 | 10/1999 |

(Continued)

OTHER PUBLICATIONS

W. Ten Cate et al., "Trigg & Link a New Dimension in Television Program Making," Proceedings of TECMAST '97, Service and Techniques, May 1997, pp. 51-85.

(Continued)

*Primary Examiner* — Chenea Smith
(74) *Attorney, Agent, or Firm* — Cantor Colburn LLP

(57) ABSTRACT

A system and method for resource sharing are provided. The method includes storing an electronic programming guide (EPG) application and an EPG, determining when local memory of a local video device lacks capacity to download additional time of the EPG, and communicating with another device to transmit a resource request to the other device to download the additional time of the EPG to storage in the other device. The method also includes processing for display monitoring data that indicates remaining storage space in the storage of the other device, querying the other device to determine what programming is being viewed, and processing controls included in the EPG application that enable access to the storage of the other device to interact with the EPG stored on the other device through the local video device to schedule a programming event at the local video device.

20 Claims, 3 Drawing Sheets

(56) References Cited

U.S. PATENT DOCUMENTS

| | | |
|---|---|---|
| 5,465,384 A | 11/1995 | Bejan et al. |
| 5,481,296 A | 1/1996 | Cragun et al. |
| 5,485,518 A | 1/1996 | Hunter et al. |
| 5,530,469 A | 6/1996 | Garfinkle |
| 5,534,913 A | 7/1996 | Majeti et al. |
| 5,559,949 A | 9/1996 | Reimer et al. |
| 5,619,247 A | 4/1997 | Russo |
| 5,619,251 A | 4/1997 | Kuroiwa et al. |
| 5,668,591 A | 9/1997 | Shintani |
| 5,671,267 A | 9/1997 | August et al. |
| 5,694,162 A | 12/1997 | Freeny, Jr. |
| 5,699,107 A | 12/1997 | Lawler et al. |
| 5,710,815 A | 1/1998 | Ming et al. |
| 5,737,552 A | 4/1998 | Lavallee et al. |
| 5,774,170 A | 6/1998 | Hite et al. |
| 5,778,135 A | 7/1998 | Ottesen et al. |
| 5,793,438 A | 8/1998 | Bedard |
| 5,801,747 A | 9/1998 | Bedard |
| 5,812,123 A | 9/1998 | Rowe et al. |
| 5,818,935 A | 10/1998 | Maa |
| 5,828,402 A | 10/1998 | Collings |
| 5,850,218 A | 12/1998 | LaJoie et al. |
| 5,917,481 A | 6/1999 | Rseszewski et al. |
| 5,949,471 A | 9/1999 | Yuen et al. |
| 5,973,683 A | 10/1999 | Cragun et al. |
| 5,982,363 A | 11/1999 | Naiff |
| 6,008,802 A | 12/1999 | Iki et al. |
| 6,009,433 A | 12/1999 | Kurano et al. |
| 6,016,141 A | 1/2000 | Knudson et al. |
| 6,023,267 A | 2/2000 | Chapuis et al. |
| 6,025,869 A | 2/2000 | Stas et al. |
| 6,046,760 A | 4/2000 | Jun |
| 6,057,872 A | 5/2000 | Candelore |
| 6,104,423 A | 8/2000 | Elam |
| 6,122,660 A | 9/2000 | Baransky et al. |
| 6,195,797 B1 | 2/2001 | Williams, Jr. |
| 6,240,555 B1 | 5/2001 | Shoff et al. |
| 6,249,320 B1 | 6/2001 | Schneidewend et al. |
| 6,263,505 B1 | 7/2001 | Walker et al. |
| 6,314,572 B1 | 11/2001 | LaRocca et al. |
| 6,326,982 B1 | 12/2001 | Wu et al. |
| 6,463,207 B1 | 10/2002 | Abecassis |
| 6,496,862 B1 | 12/2002 | Akatsu et al. |
| 6,519,770 B2 | 2/2003 | Ford |
| 6,571,392 B1 | 5/2003 | Zigmond et al. |
| 6,577,806 B1 | 6/2003 | Hirota |
| 6,597,405 B1 | 7/2003 | Iggulden |
| 6,601,103 B1 | 7/2003 | Goldschmidt Iki et al. |
| 6,604,240 B2 | 8/2003 | Ellis et al. |
| 6,675,384 B1 | 1/2004 | Block et al. |
| 6,732,367 B1 | 5/2004 | Ellis et al. |
| 6,774,926 B1 | 8/2004 | Ellis et al. |
| 6,792,618 B1 | 9/2004 | Bendinelli et al. |
| 6,920,281 B1 | 7/2005 | Agnibotri et al. |
| 6,947,966 B1 | 9/2005 | Oko, Jr. et al. |
| 2002/0010935 A1 | 1/2002 | Sitnik |
| 2002/0056129 A1 | 5/2002 | Blackketter et al. |
| 2002/0073424 A1 | 6/2002 | Ward, III et al. |
| 2002/0162109 A1 | 10/2002 | Shteyn |
| 2002/0174430 A1 | 11/2002 | Ellis et al. |
| 2002/0184638 A1 | 12/2002 | Agnihotri et al. |
| 2003/0065774 A1 | 4/2003 | Steiner et al. |
| 2003/0131356 A1 | 7/2003 | Proehl et al. |
| 2005/0047752 A1 | 3/2005 | Wood et al. |
| 2005/0216936 A1 | 9/2005 | Knudson et al. |
| 2006/0095937 A1 | 5/2006 | Knudson et al. |

FOREIGN PATENT DOCUMENTS

| | | |
|---|---|---|
| WO | WO9713368 A1 | 4/1997 |
| WO | WO9816062 A1 | 4/1998 |
| WO | WO9847286 A1 | 10/1998 |
| WO | WO9904561 A1 | 1/1999 |
| WO | WO0014954 A2 | 3/2000 |
| WO | WO0020976 A2 | 4/2000 |
| WO | WO0186948 A2 | 11/2001 |

OTHER PUBLICATIONS

Press Release: Excite Inc. "Excite Couch Potatoes INto Real-Time Online Judges with National Television Event", Mar. 28, 1998, 2 pgs.

D. Barkai, "An Introduction to Peer-to-Peer Computing" Intel Developer Update Magazine, Intel Corporation, Oct. 2000, pp. 1-7.

Cahners In-Stat Group Report Information, "Multimedia Home Networking: IEEE 1394 and the Competition", Dec. 2001.

NFL.Com, [online]; [retrieved on Oct. 26, 2006]; retrieved from the Internet, http://webarchive.org/we/19970419062432/www.nflcom/news/nflnews/0326sked.html.

METHOD TO ENABLE COOPERATIVE PROCESSING AND RESOURCE SHARING BETWEEN SET-TOP BOXES, PERSONAL COMPUTERS, AND LOCAL DEVICES

CROSS-REFERENCE TO RELATED APPLICATIONS

This application is a continuation of U.S. patent application Ser. No. 12/241,918 filed Sep. 30, 2008, the contents of which are incorporated by reference herein in their entirety, which is a continuation of U.S. patent application Ser. No. 10/107,566 filed Mar. 27, 2002, now U.S. Pat. No. 7,430,753, the contents of which are incorporated by reference herein in their entirety.

FIELD OF THE INVENTION

This invention relates to cooperative processing and resource sharing, and particularly, to cooperative processing and resource sharing using a set-top box to optimize utilization of local resources.

BACKGROUND

Many homes and businesses receive media services through set-top boxes that are typically connected to television sets. Set-top boxes, also known as video signal access control systems, deliver multimedia content, such as music, video, and programming information, as well as provide interactive Internet connectivity. In general, the set-top box is an integrated receiver decoder (IRD) that receives and decodes (unscrambles and/or decompresses) digital television (DTV) and other multimedia transmissions sent as signals from a remote transmitter.

A traditional set-top box (hereinafter referred to as a "set-top box") receives these signals via a closed, unidirectional network over wireline, fiber, hybrid-fiber coax (HFC), satellite, wireless, or other transmission medium. In unidirectional systems, set-top boxes are isolated such that each set-top box must perform all of the functions required to deliver the particular type of media to the consumer. Therefore, a set-top box can become obsolete when the demands of the delivered media and services exceed its communications, processing, or storage capabilities.

Often, there are two or more televisions in one home, each requiring a separate set-top box. Advances in technology continuously result in more sophisticated set-top boxes, and the price generally increases accordingly. Therefore, to maintain the same or similar levels of features in every room, an upgrade to one set-top box necessitates a costly upgrade to all set-top boxes in a home.

In addition to set-top boxes, many of the same homes and businesses utilize other devices that have communications, processing, and digital storage capabilities, such as personal computers and digital video recorders. These devices may have excess capacity that would be available for a resource sharing scheme. Furthermore, the consumer may possess multiple set-top boxes, each set-top box having varying capabilities that could be cooperatively utilized.

There is currently no system or method that enables a set-top box to utilize any resources possessed by a more sophisticated set-top box or by local devices that are connected or connectible via a network-like communications scheme. Therefore, what is needed is a system and method that will optimize the utilization of resources, and that will improve the economics and extend the useful life of set-top boxes.

SUMMARY OF THE INVENTION

The present invention addresses the needs identified above by providing a system and method that enables cooperative processing and resource sharing between set-top boxes, personal computers, and other local resources.

The method includes storing an electronic programming guide (EPG) application and an EPG, determining when local memory of a local video device lacks capacity to download additional time of the EPG, and communicating with another device to transmit a resource request to the other device to download the additional time of the EPG to storage in the other device. The method also includes processing for display monitoring data that indicates remaining storage space in the storage of the other device, querying the other device to determine what programming is being viewed, and processing controls included in the EPG application that enable access to the storage of the other device to interact with the EPG stored on the other device through the local video device to schedule a programming event at the local video device.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

The accompanying drawings, which are incorporated in and form part of the specification, illustrate the present invention when viewed with reference to the description, wherein.

DETAILED DESCRIPTION

Detailed embodiments of the present invention are disclosed herein; however, it is to be understood that the disclosed embodiments are merely exemplary and that the invention may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
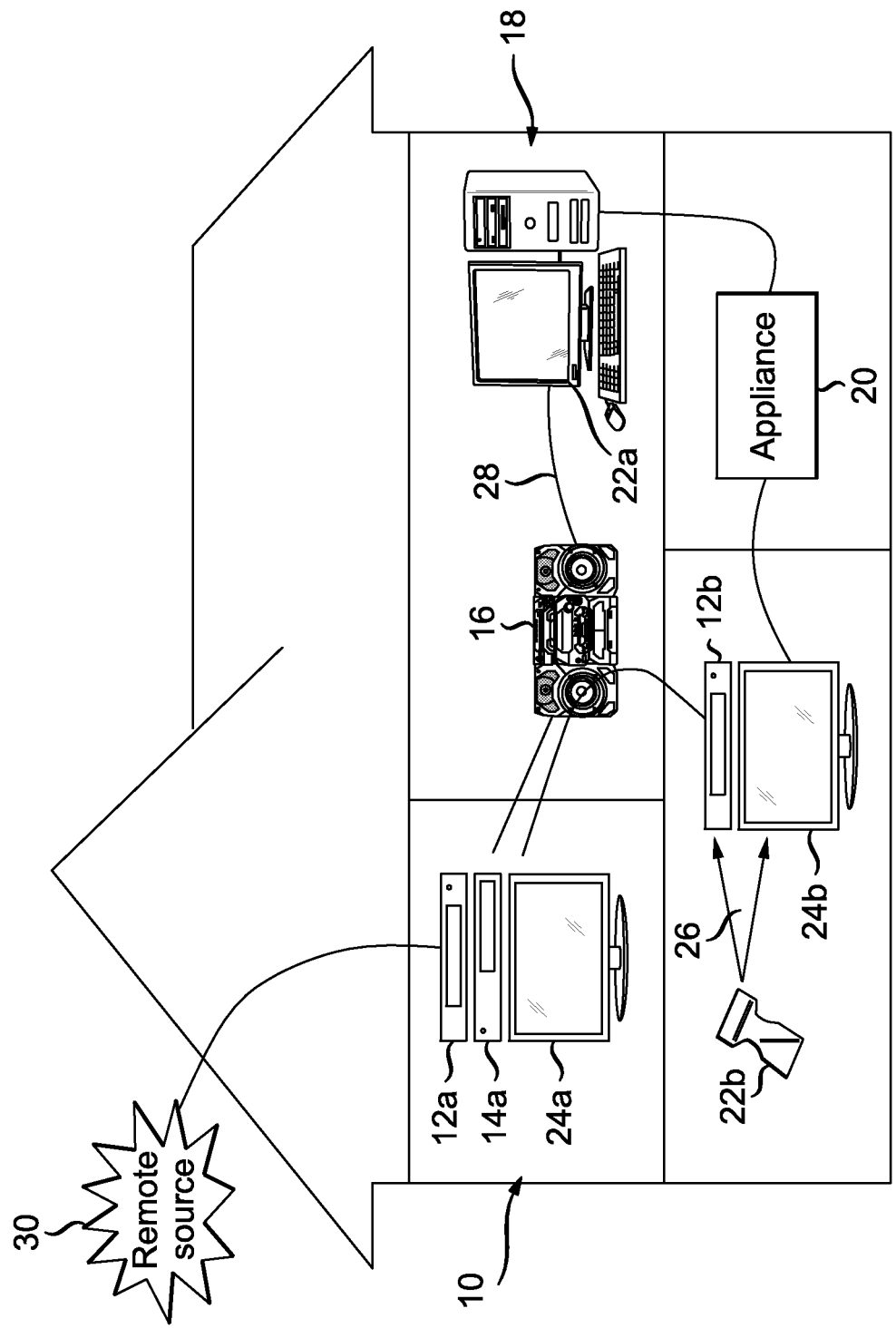
FIG. 1 is an illustration of the typical environment of an embodiment of this invention.

FIG. 1 illustrates the typical environment of this invention, which is implementable for example, in homes, businesses, or institutions, where there are multiple local devices each having communications, processing, and/or storage capabilities, particularly with respect to video and video-related content. Video content includes displayable content such as streaming MPEG compressed digital content, Internet-on-TV content such as AOLTV™ or WebTV™, interactive television, and video-on-demand (VOD). Video-related content includes data that is associated with the delivery of video, including compressed digital audio and second audio program (SAP) data, text data such as captioning and transaction data, Program and System Information Protocol (PSIP) data such as an electronic program guide (EPG), user input data, and control, address, and data signals. Video and video-related content is hereinafter collectively referred to as "video content."

FIG. 1 shows a number of exemplary local devices that collectively encompass the members of a resource sharing group 10, including set-top boxes 12a and 12b (collectively referred to as 12), video recorders and/or players 14, audio recorders and/or players 16, processing devices 18, appliances 20, input devices 22a and 22b (collectively referred to as 22), and video display devices 24a and 24b (collectively referred to as 24). Each local device can receive, adapt, or transmit video content, while utilizing external processing, communications, or storage resources of at least one other connected local device. The video content is transmitted from one local device to another via signals 26 that travel through a suitable wireless or tangible local transmission medium 28. For example, infrared signals can travel "through-the-air," and digital signals can travel through coaxial or fiber optic cabling.

In one embodiment, at least one local device is a video device such as a set-top box. A typical set-top box performs a multimedia delivery function, such as (but not limited to) converting digital television (DTV) broadcasts for display on an analog television, and decoding and decompressing encrypted cable or satellite television transmissions. DTV content also requires decoding, as it is usually encoded in MPEG-2 format. The multimedia content is delivered from a content provider, which may be a remote source, such as a cable or satellite cable service provider, movie production studio, or entertainment provider. Alternatively, the content provider may be another local device, such as a digital camera. A remote source delivers the content using any appropriate video transport, such as NTSC analog broadcast or cable television, or digital transports such as digital broadcast or cable television and direct broadcast satellite (DBS).

Figure 2:
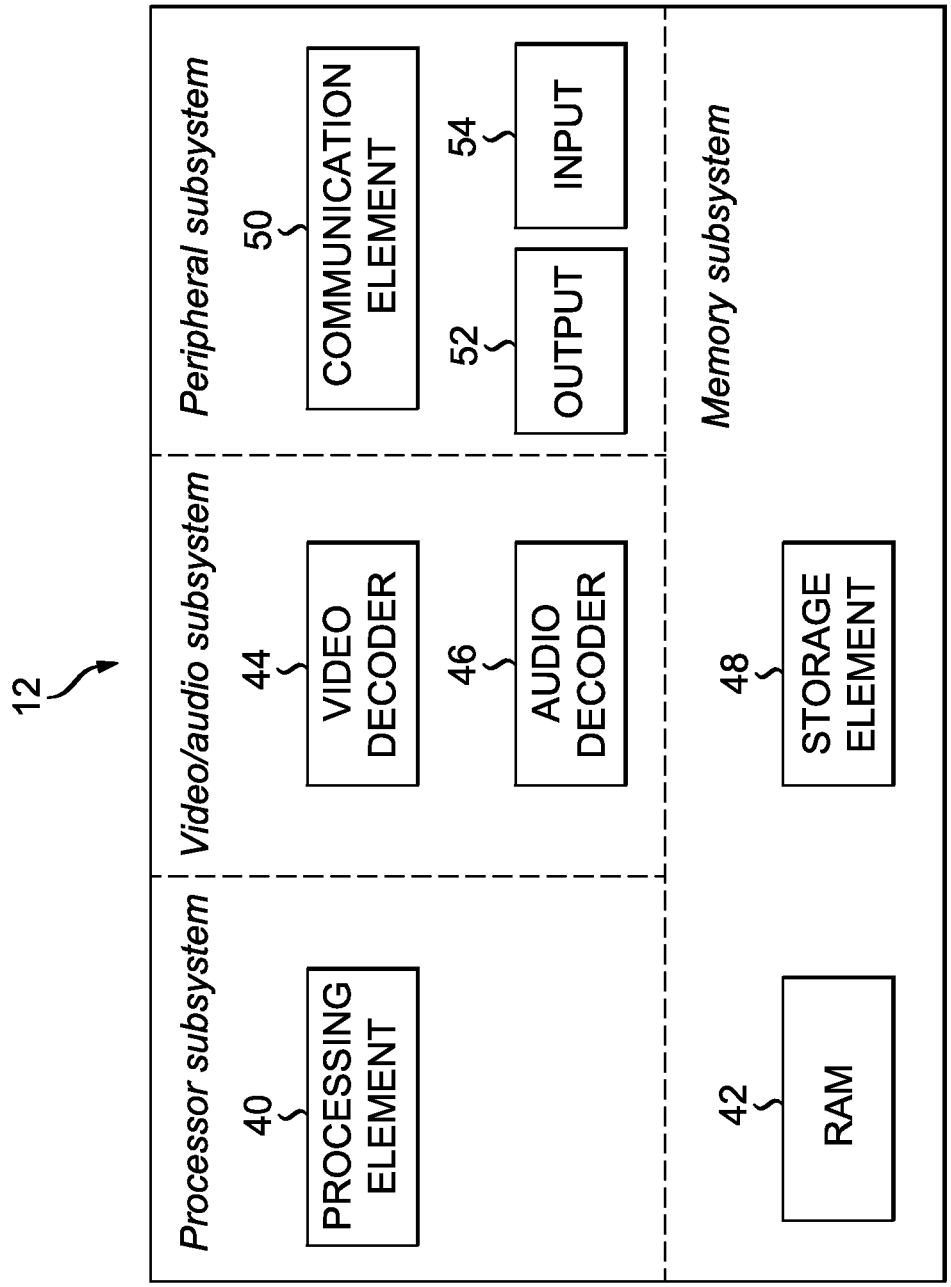
FIG. 2 is a block diagram of the components of a local device, according to an embodiment of this invention.

FIG. 2 is a block diagram of the components of a set-top box 12, according to an embodiment of this invention. The typical set-top box has various elements for processing, storing, receiving and transmitting video content to and from a content provider. A typical set-top box 12 contains at least one processing element 40 such as a microprocessor. The processing element 40 runs an operating system such as Linux™ or Windows CE™. A set-top box 12 also typically includes a volatile random access memory (RAM) 42, a video decoder 44, and an audio decoder 46, for parsing and/or decoding a video transport stream. The specific types of components in a typical set-top box 12 vary according to the multimedia standard that is utilized, such as the DVB-T COFDM (European Terrestrial Digital Video Broadcasting Coded Orthogonal Frequency Division Multiplexing) and ATSC 8-VSB (Advanced Television Systems Committee 8-Level Vestigial Side-band) standards for digital television. Each set-top box 12 may also contain a non-volatile storage element 48, such as a hard drive, for storing recorded television broadcasts and software. The set-top box 12 includes a communications element 50, a receiving input 52, and a transmitting output 54. The communications element 50 is used to communicate with other members of the RSG, and typically comprises a local communications means that is internal to the set-top box. Although not shown in FIG. 2, a remote source can also communicate with the set-top box 12 via the communications element 50. Exemplary local communications means include modems, network interface circuit boards such as serial and infrared communications controllers (SICC), general purpose input/output (GPIO) controllers, and UART interfaces (16550). The input 52 and output 54 physically interconnect the communications element 50 to the local transmission medium 28, so as to relay data to and from the communication element 50. Exemplary inputs 52 and outputs 54 include modem jacks, cable or video feeds, data ports, and infrared focusing or collecting lenses.

In addition to or instead of the multimedia delivery functionality, the set-top box enables a display device such as a television to function as a user interface to the Internet. In this aspect the set-top box includes a web browser (a Hypertext Transfer Protocol client) and utilizes a protocol such as TCP/IP.

The foregoing provides only non-exhaustive examples of the functionality that may exist in a typical local device such as a set-top box.

An embodiment of this invention comprises a local resource sharing group (RSG) that includes local devices that are adapted to perform any combination of functions such as processing, communication, and storage of video content. The video content is transmitted from a content provider to at least one member via cable, broadcast, satellite, or any other manner of transmitting video signals. The communication between the content provider may occur, for example, over any suitable external network such as a public switched telephone network (PSTN), a cable network, or a satellite network. Connectivity between members of the RSG can be accomplished using any suitable networking standard and over any appropriate local transmission medium, such as (but not limited to) Ethernet over coax, 802.11 over a wireless local access network (LAN), HomePNA™ over wire lines, or HomePlug™ over a power line carrier (PLC). Preferably, the local transmission medium will conform to a protocol that can facilitate high speed isochronous data transfers between numerous external local devices, such as the IEEE 1394 external bus.

Members of the RSG can communicate and exchange video content with one another using any suitable method, local transmission medium, and communications protocol. For instance, a first local device can communicate with a second local device over a fixed or wireless local transmission medium, by sending signals that mimic infrared remote control signals. Alternatively, the first local device can transmit more advanced control signals over the local transmission medium, where the control signals program or otherwise control the operation of the second local device.

There are many possible permutations of embodiments of systems for resource-sharing according to this invention, each involving a set-top box or other local device that is configured to interface with at least one other local device that has processing, storage, or communications capabilities. For instance, a set-top box can interface with a video device such as a VCR or DVD player. The video device can interface with an audio device or other household appliance. A processing device such as a PC can interface with and control the interaction between any or all of the local devices. An operator can interface with any or all of the local devices using an input device, such as a remote control, mouse, or computer keyboard.

There are also many embodiments of methods for resource-sharing according to this invention, each involving a local device utilizing the resources of at least one other local device. For instance, a first local device can supplement its own storage capacity by storing and retrieving video content from the hard drive or other storage element of a second local device. A first local device can similarly utilize the processor of a second local device, for example, to increase the speed at which applications can be run. A first local device can utilize the bandwidth that is available to a second local device, for example, to increase the speed at which video content can be transferred from local device to local device or from remote source to local device. At least one local device can utilize its own resources to control the interaction of all or some of the other local devices that are members of the RSG. Video content received or stored by one local device can be accessed and shared by other local devices.

The set-top box is periodically called upon to perform a task. For example, the user may issue instructions using an input device. The instructions instruct the set-top box to perform the task of recording a television program. Before performing the task, the set-top box determines whether an internal resource is available, (i.e., the resource exists and is adequate, and no delegation to another local device has been made, such that the delegee is designated to provide the resource). If an internal resource is available to enable the set-top box to perform the task, the set-top box performs the task using those internal resources. If the internal resource is not available to enable the set-top box to perform the task, the set-top box communicates with a first group member, which is either a targeted source of the resource or a control member. If the first group member is a targeted source of the resource, the communications session is directed to determining whether the first group member has an available resource that can be shared to enable the set-top box to perform the task. If the first group member has an available resource, the set-top box accesses the resource of the first group member and performs the task using the resource of the first group member. However, if the first group member does not have an available resource to enable the set-top box to perform the task, the set-top box can query the other group members, for example, either one after another until the resources are located, in a predetermined order, or according to which group members have resource availability as determined by a monitoring scheme. A monitoring scheme may be implemented by a local device such as a PC that tracks the availability of resources in the RSG, for example, by periodically or continually requesting or receiving availability data and by providing the availability data to the member that is inquiring as to the availability of resources. The user may have access to the monitoring data, such as through a display screen that shows the remaining storage space of all local devices. The user may then choose which device provides the resource accordingly.

The set-top box's query determines whether any of the group members have available resources to enable the set-top box to execute the instructions. If none of the group members has the resources available, the set-top box can wait, or return a message indicating that the task cannot be performed.

In an embodiment that features centralized control, the first group member with which the set-top box communicates is a control member. The communications session is directed to requesting the control member to query the other group members to find the necessary resources.

Several examples of possible embodiments are described below.

As a first example of the operation of an embodiment of this invention, two set-top boxes share a storage resource. This example includes a first set-top box 12a that is a relatively simple receiver and decoder of digital television content with very little storage capacity, and a second set-top box 12b that has more storage capacity. The digital content includes an electronic program guide (EPG) that allows the consumer to interactively view and select digital television content that the consumer wishes to receive. Due to the limited storage capacity of the first set-top box, the consumer can access and interact with EPG data that only encompasses a limited period of time. For example, the EPG may provide access to television programming that is being transmitted at the current time and during 48 subsequent hours. When accessing the EPG, the consumer can typically schedule reminders for individual programs that the consumer would like to view or record. In this example, the consumer cannot plan a programming schedule for a longer period of time, because the first set-top box lacks the storage capacity to download more of the EPG. However, according to this invention, the first set-top box 12a is connected to the second set-top box 12b, which contains a hard drive that has sufficient capacity for this task. The first set-top box 12a participates in a communications session with the second set-top box 12b thereby securing access to the storage resource of the second set-top box 12b. The download and transfer of the desired EPG to the second set-top box 12b is managed by one of the set-top boxes or by another local device.

Resource sharing can occur in a "push" or "pull" configuration. In other words, the first set-top box 12a can pull by requesting access to the resources of the second set-top box 12b, or the second set-top box 12b can push by offering its available resources at any time. Furthermore, the second set-top box 12b can provide centralized resource control by performing resource availability queries or by managing the download of an EPG directly to a third set-top box or other local device, even though the consumer will view and interact with the EPG from the first set-top box 12a. Alternatively, each local device can request resources and manage the receipt thereof, in a distributed control scheme. Similarly, the second set-top box 12b can be designated as the storage device for both set-top boxes for all downloads, thereby providing centralized storage. Storage of the EPG or any other content can also be accomplished using another type of storage device, such as the storage element within a broadband media gateway or a personal computer.

Each local device in the RSG can either directly or indirectly access content from at least one other local device on the RSG. For example, the consumer can use one local device to access an MP3 or video that is under the control of another local device. The consumer can use the first local device to access a content management application hosted by a processing device, such as a personal computer (PC) or a processor within a set-top box or other local device. The content management application is a software program that is loaded from a computer-readable medium, such as a hard disk drive, a floppy disk, or a CD. Using the content management application, the processing device acts essentially as a library element by querying other local devices, cataloging the content of other local devices, procuring content from other local devices, and by providing the consumer access to the content.

In another example, one set-top box can be used by the consumer to monitor the activities of the other set-top boxes that are members of the RSG, such as to provide parental supervision. Referring again to FIG. 1, as a case in point, a parent using set-top box 12b can query set-top box 12a in a child's room to determine whether the child is watching the television 24a and what program the child is viewing.

In another example of the operation of an embodiment of the invention, at least one set-top box shares the processing resources of a processing device such as a PC. The processing device could also be a microprocessor that is integral to any other local device. In this example, the need for a complex remote control or onscreen menu for a set-top box is eliminated by enabling the consumer to control certain functions of the set-top box directly from the PC. For instance, a software application can generate a graphical user interface (GUI) on the PC from which the user can easily select favorite channels or custom channel labels using fields, check-boxes, or radio buttons, rather than performing a tedious on-screen process with a remote control and a television display. Similarly, the user can perform password-protected parental control of permissible channels to be tuned by any one of the home set-top boxes 12. The software application can be provided and updated by the remote source 30 or by the consumer, such that the software application generates the GUI that facilitates interaction between the RSG members. The software application can reside on the PC or on another local device. For example, the same application that comprises the EPG and resides on a set-top box can also include controls that enable access to other devices in the RSG. This example illustrates how this invention eliminates duplication of consumer effort that is required to program each set-top box individually, by allowing the consumer to program any or all of the devices in the RSG with the same or different settings, in one sitting using one PC.

Returning to the aforementioned parental supervision feature, the parent may utilize the PC to collect detailed records of the child's viewing history for the purpose of monitoring whether the child follows a rule that the child is limited to, for example, one hour of viewing approved programs per day. Alternatively, the parent can even enforce the rule by instructing the PC to control the set-top box to become disabled when the child attempts to exceed the maximum allowable viewing time.

In yet another example of the operation of this invention, at least one set-top box is connected to a video device such as a digital video camera. Typically, a non-linear editor is required to translate digital video content to a video tape that can be viewed on an analog television, through the use of a video cassette recorder (VCR). According to this example, the set-top box can request or receive digital video content directly from the digital video camera without a video tape or other intermediary device. The set-top box then formats the digital video content for display on a video device. Similarly, compressed audio (such as MP3 files) from a non-external source such as an MP3 player or PC can be directed to a stereo or other audio device 16 that is a member of the RSG.

As another example of the operation of the invention, a first set-top box shares resources with a processing device, such as a PC. A set-top box may function as a personal video recorder (PVR) by retaining a predetermined amount of recently viewed video content on a revolving basis. The consumer can direct the first set-top box to take advantage of the email capabilities of a connected PC or other messaging device to email, instant message, or otherwise send a segment of the retained video content (for example, the last play of a football game) to a recipient in another local or remote location who supports the opposing team and is operating a second set-top box or local device. Alternatively, the email or other message originates from outside the RSG and is sent directly to the second set-top box, or forwarded by the PC or other messaging device to the second set-top box. The recipient of the email or other message can be notified that another local device has content to be delivered, and can be prompted to elect whether to interrupt the current programming or to ignore the message, such as by the EPG appearing on some portion of the screen.

The set-top box can also avail itself of a resource control application that performs resource management. The resource control application is a software program that is loaded from a computer-readable medium. When the set-top box requests resources, the set-top box need not direct the request to a specific local device. Rather, all requests for resources can be directed to a control device that runs the resource control application. The resource control application enables the control device to determine which resources belonging to members of the RSG have excess capacity, and which content should be deleted from system devices to free resources due to the age of or lack of activity involving the content. Using the resource manager application, the user can designate which resources are accessible to each member of the RSG.

In another example, a set-top box or other local device is designated as the gateway that performs security checks before allowing dissemination of source or RSG content to any other set-top boxes and local devices connected to the system. As a case in point, a set-top box can protect the remote source that provides video services by selectively preventing a PC from accessing and copying a pay-per-view video that is being viewed via a set-top box. At the same time, the set-top box can selectively permit the PC to access and copy a news, advertising, or other type of program. The set-top box can also protect the consumer by preventing unauthorized access of the consumer's PC through any external cable, satellite, or digital input to the RSG.

In yet another example, a refrigerator or other appliance is connected to the RSG. The consumer can request or otherwise receive email or video via a set-top box or broadband media gateway, where the email or video contains content such as recipes or cooking shows. The consumer uses a display on the appliance to enter grocery and other shopping items to be added to the central shopping list for the next trip to the store. An external or remote source of video content can push an advertisement for a particular product to the appliance, and the consumer can interact with the advertisement to select and order the advertised product. The consumer's order can be transmitted directly to the remote source using the communications resources of the appliance or of another local device. The product can be added to the central shopping list. A processing device can control such transactions such as to ensure that duplicate orders are not placed, and that a preset spending limit is not exceeded.

Figure 3:
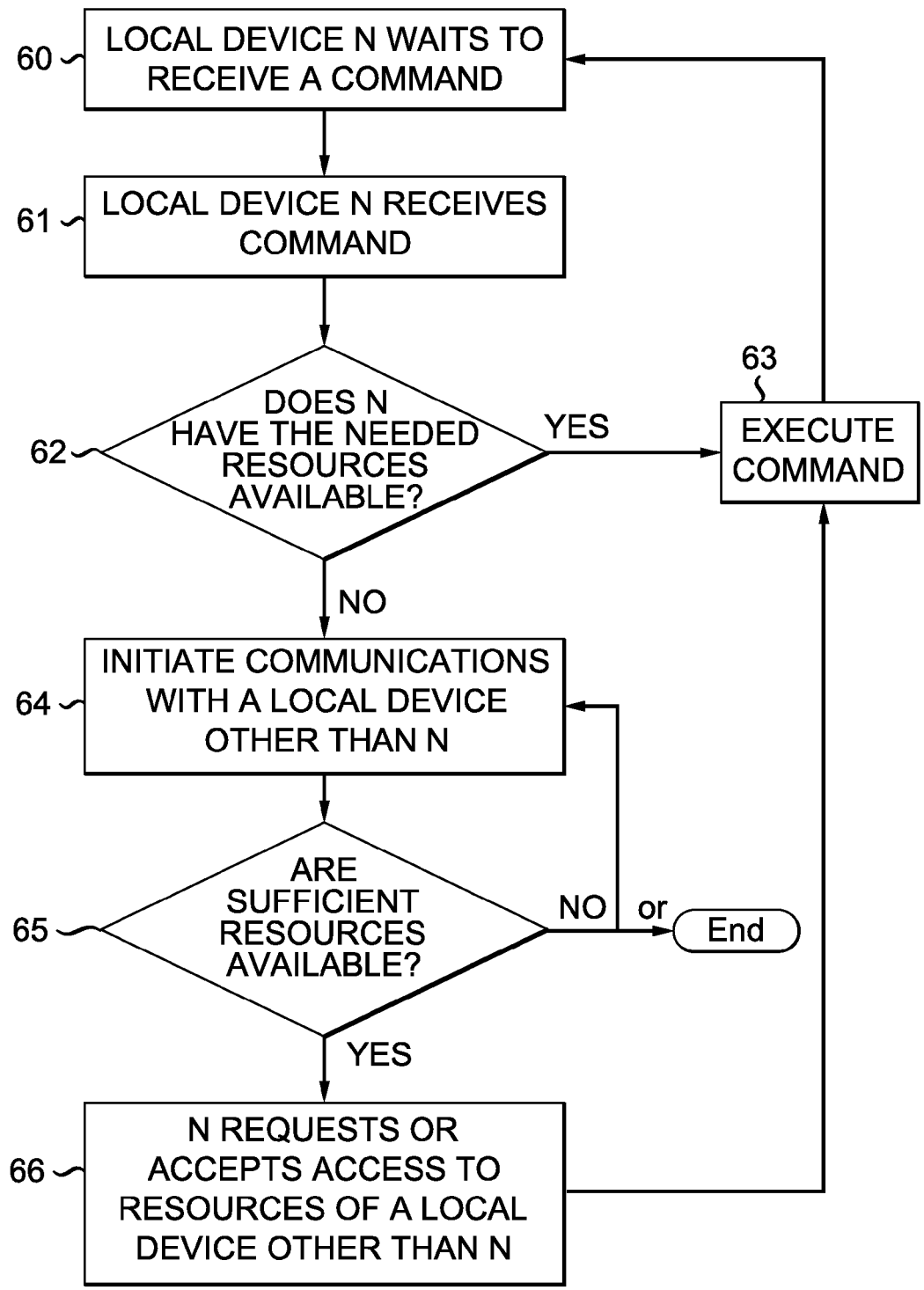
FIG. 3 is a flow chart of a method of resource sharing according to an embodiment of this invention.

FIG. 3 is a flow chart of a method of resource sharing according to an embodiment of this invention. In this embodiment, at 60, a local device (designated as "N") such as a set-top box waits to receive a command from an input device such as a remote control, keyboard, touch screen, mouse, trackball, track pad, or any other pointing device for positioning a cursor on a display device, or from a direct communications link with a content provider or other local device. At 61, a command is received which instructs N to perform a corresponding task. At 62, N determines whether N possesses internal resources that are available to perform the task. Resources are available when the resources are present, adequate, and when the provision of the particular resource has not been delegated to another local device. For instance, in an RSG composed of a plurality of set-top boxes, one set-top box can be designated to receive video content from a remote source, thereby making the content available for all other set-top boxes that are members of the RSG. Where provision of a resource has been delegated to another local device, N will not utilize its own resource even if that resource is present and adequate. Absent delegation, at 63, N will execute the command if N has available resources. However, if N does not have available resources, then at 64, N will initiate a communications session with another local device, which may be a control member. At 65, N queries the local device to determine whether resources are available either from that local device, or if that local device is a control member, from any local device in the RSG. In the event available resources are not found, N may query another local device, wait and requery the same local device, or end the process. If available resources are found, then at 66, N will request or accept access to the available resources, and at 63, will execute the command.

The foregoing description of the preferred embodiments of the invention has been presented only for the purpose of illustration and description and is not intended to be exhaustive or to limit the invention to the precise forms disclosed. Many modifications and variations are possible in light of the above teaching. For example, all of the foregoing examples can be implemented with any suitable combination of device interface technologies or push/pull capabilities between devices. Content may be downloaded from sources in its entirety before it is accessible to any RSG device, or multimedia may be accessed by streaming from its source or from device to device. Additionally, the types of devices and the configuration thereof, the local transmission media, communications protocols, resource sharing schemes, and the types of multimedia content in the examples are not exhaustively enumerated. Rather, this invention is applicable to resource sharing between local devices such as set-top boxes, PCs, PDAs, multimedia devices, and special purpose broadband devices, which communicate over any suitable communications medium using any suitable communications protocol, and which share various resources to optimize or customize the handling of various types of multimedia content.

The embodiments were chosen and described in order to explain the principles of the invention and their practical application so as to enable others skilled in the art to utilize the invention and various embodiments and with various modifications as are suited to the particular use contemplated.

What is claimed is:

1. A video device, comprising:
   a local memory;
   a communications element for communicating with the local memory, the local memory storing an electronic programming guide application and an electronic programming guide; and
   a processing element for determining when the local memory lacks capacity to download additional time of the electronic programming guide;
   the processing element causing the communications element to communicate with another device to transmit a resource request to the another device to download the additional time of the electronic programming guide to storage in the another device upon the local memory lacking capacity to download additional time of the electronic programming guide.

2. The video device of claim 1, wherein the processing element queries the another device to determine what programming is being viewed at the another device.

3. The video device of claim 1, wherein the processing element processes controls included in the electronic programming guide application that enable access to the storage of the another device to interact with the electronic programming guide stored on the another device through the processing element to schedule recording of a broadcast program at the local memory.

4. The video device of claim 1, wherein the processing element determines that a resource is needed to perform a task.

5. The video device of claim 1, wherein the processing element queries the another device to determine whether a shared resource associated with the another device is available to a second video device, in response to receiving a resource request from the second video device.

6. The video device of claim 1, wherein the processing element collects a viewing history associated with the another device and processes an instruction to disable the another device when a maximum allowable viewing time is exceeded.

7. The video device of claim 1, wherein the local memory stores a predetermined amount of recently viewed video content on a revolving basis, and the processing element causes the communications element to communicate with a remote personal computer to send a segment of stored video content to a recipient at a remote location.

8. The video device of claim 1, wherein the processing element deletes content from the local memory due to lack of activity.

9. The video device of claim 1, wherein the processing element performs a security check that prevents access and copying of pay-per-view video.

10. A method of resource sharing, comprising:
    storing an electronic programming guide application and an electronic programming guide;
    determining when local memory of a local video device lacks capacity to download additional time of the electronic programming guide; and
    communicating with another device to transmit a resource request to the another device to download the additional time of the electronic programming guide to storage in the another device upon the local memory lacking capacity to download additional time of the electronic programming guide.

11. The method of claim 10, further comprising:
    querying the another device to determine what programming is being viewed.

12. The method of claim 10, further comprising:
    processing controls included in the electronic programming guide application that enable access to the storage of the another device to interact with the electronic programming guide stored on the another device through the local video device to schedule recording of a broadcast program at the local video device.

13. The method of claim 10, further comprising:
    when a resource is not available, then querying a second device to determine whether a shared resource is available from the second device.

14. The method of claim 10, further comprising collecting a viewing history associated with the another device and processing an instruction to disable the another device when a maximum allowable viewing time is exceeded.

15. The method of claim 10, further comprising storing a predetermined amount of recently viewed video content on a revolving basis, and communicating with a remote personal computer to send a segment of stored video content to a recipient at a remote location.

16. A non-transitory computer readable medium on which is encoded instructions for performing:
    storing an electronic programming guide application and an electronic programming guide;
    determining when local memory of a local video device lacks capacity to download additional time of the electronic programming guide; and
    communicating with another device to transmit a resource request to the another device to download the additional time of the electronic programming guide to storage in the another device upon the local memory lacking capacity to download additional time of the electronic programming guide.

17. The computer readable medium of claim 16, further comprising instructions for performing:
   querying the another device to determine what programming is being viewed.

18. The computer readable medium of claim 16, further comprising instructions for performing:
   processing controls included in the electronic programming guide application that enable access to the storage of the another device to interact with the electronic programming guide stored on the another device through the local video device to schedule recording of a broadcast program at the local video device.

19. The computer readable medium of claim 16, further comprising instructions for performing:
   when a resource is not available, then querying a second device to determine whether a shared resource is available from the second device.

20. The computer readable medium of claim 16, further comprising instructions for performing:
   collecting a viewing history associated with the another device and to process an instruction to disable the another device when a maximum allowable viewing time is exceeded.

\* \* \* \* \*